Jan. 13, 1942. C. A. WALKER 2,269,615
FISHING LINE FLOAT
Filed April 27, 1940
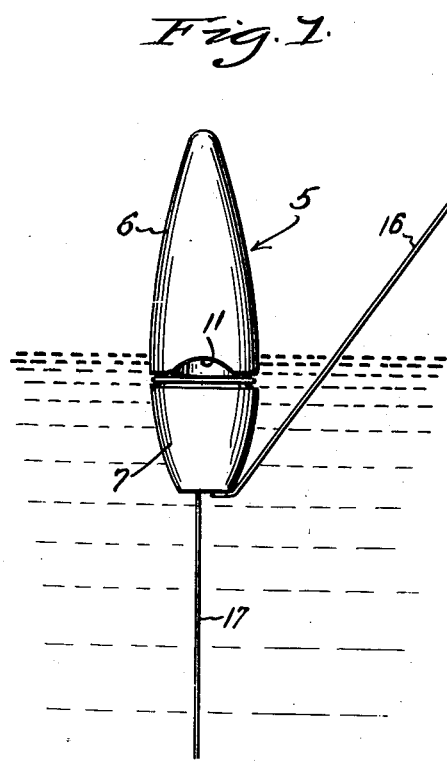
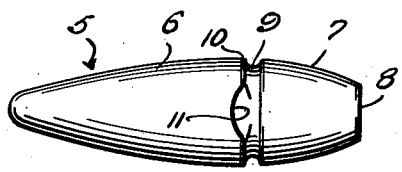
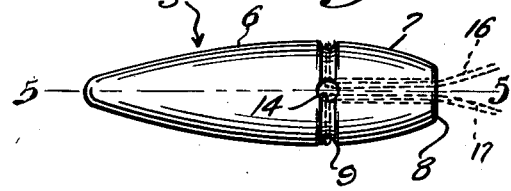
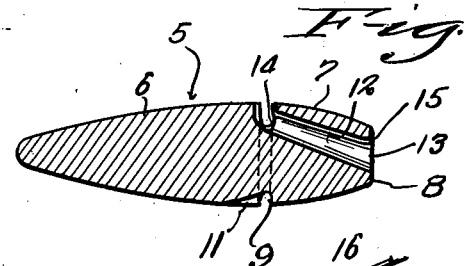
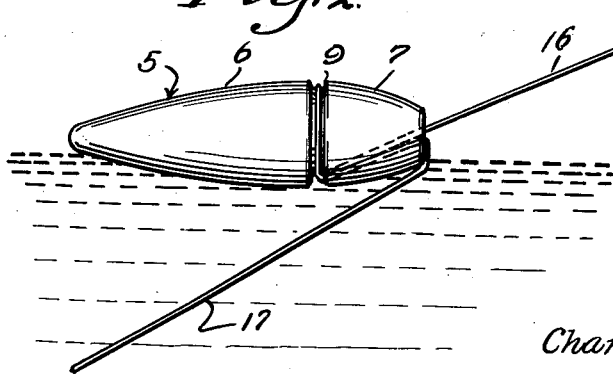
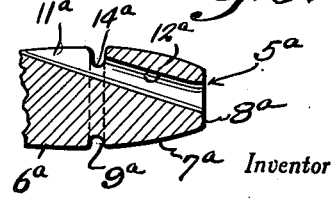
Inventor
Charles A. Walker
By Clarence A. O'Brien
Attorney Patented Jan. 13, 1942

2,269,615

UNITED STATES PATENT OFFICE 2,269,615

FISHING LINE FLOAT

Charles A. Walker, Renwick, Iowa

Application April 27, 1940, Serial No. 332,084

5 Claims. (Cl. 43—49)

My invention relates to improvements in floats for fishing lines, and the primary object of my invention is to provide a float having streamlined shape and manner of connection of the fishing line thereto, whereby a more sensitive feel of the line, especially in fast water, is provided for, together with more efficient casting and reeling in through substantial elimination of entanglement of the line and entanglement with formations in the water.

Other important objects and advantages of my invention will be apparent from a reading of the following description taken in connection with the appended drawing, wherein for purposes of illustration I have shown a preferred embodiment of my invention.

In the drawing:

Figure 1 is a general side elevational view showing the device in fishing position on a fishing line.

Figure 2 is a view similar to Figure 1 but showing the device in reeling in position.

Figure 3 is a top plan view.

Figure 4 is a bottom plan view showing in dotted lines the course of the loop of the fishing line in its connection with the float.

Figure 5 is a longitudinal sectional view taken through Figure 4 approximately on the line 5—5.

Figure 6 is a fragmentary view similar to Figure 5 of a slightly modified form.

Referring in detail to the drawing, and first to the form of the invention shown in Figures 1 through 5, the numeral 5 generally designates the float which may be made of wood or in case of forming the same of plastic material such as Celluloid, and the like, hollow so as to have the required buoyancy and correct weight. The float is generally cylindrical in cross section and its rear part has a boat tail shape designated by the numeral 6 which extends for about two-thirds of the length of the float, the forepart being curved as indicated by the numeral 7 to a slightly greater extent and truncated at the front end as indicated by the numeral 8. The portions 6 and 7 are separated by a peripheral groove 9 whose edges are rounded as indicated by the numeral 10 to prevent any rough contacts with the line or with objects in the water. The top of the groove is provided with a cut-out portion 11 which is sufficiently deep and sufficiently elongated to enable the insertion of a fingernail or some other convenient small instrument into the groove and under the line therein to facilitate loosening the line when it is desired to remove the float from the line or to adjust the position of the float along the line.

The body portion 7 is provided with a bore 12 which opens as indicated by the numeral 13 through the axial center of the front of the portion 7 and declines forwardly to enter the peripheral groove 9 at the bottom and front side thereof with an opening approximately the full size of the width of the groove as indicated by the numeral 14 in Figures 4 and 5. The front end of the bore 12 is rounded as indicated by the numeral 15 to avoid any rough contact with the line 16. In the form of the invention shown in Figures 1 through 5, the bore opening 14 in the groove 9 is located approximately diametrically opposite the elongated cut-out portion 11. It is believed obvious that in the provision of a float body of hollow character, the bore 12 would be in the form of a tube extending from the front end of the float body into the groove 9.

Referring to the embodiment of the invention shown in Figure 6, the cut-out portion 11 is placed to face the opening into the groove 9 of the rear end of the bore, instead of being located directly opposite the said opening, and in this case the cut-out portion 11a is extended as a portion of the bore 12a, the bore being cut straight through the body of the float. This form of the invention is more easily constructed and requires fewer operations for the manufacturing and finishing thereof, but does not provide quite as neat an arrangement of the fishing line as the first described embodiment.

In connecting either form of the float to the fishing line 16, the selected point of the line is looped as indicated in dotted lines in Figure 4 and the apex of the loop is passed rearwardly through the bore and out through the opening 14 or 14a, as the case may be, the loop being then drawn through the said opening and passed around the tip of the body portion 6 and the line then tightened up so as to bring the bight of the loop around the groove 9 or 9a in the position illustrated in Figures 1 and 2.

In view of these arrangements, with the hook and sinker equipped portion 17 of the line 16 in the pendant fishing position illustrated in Figure 1, the float is in the upright position illustrated. However, when the line 16 is reeled in, the pull on the line is exerted on the front end or bottom of the float so that the float is tilted into the horizontal position illustrated in Figure 2 of the drawing. In this position it is obvious that the streamlined formation of the float greatly assists in drawing the float along and through the water without entanglement with the line or with any objects in the water. It is also obvious that due to the shape of the float and to the manner of its connection with the fishing line, the operation of casting is greatly facilitated and made capable of greater accuracy due to the controlled travel of the float through the air and in its entry into the water.

Although I have shown and described herein preferred embodiments of my invention, it is to be definitely understood that I do not desire to limit the application of the invention thereto except as may be required by the scope of the subjoined claims.

Having described the invention, what is claimed as new is:

1. A float for a fishing line, said float comprising an elongated body having rounded ends and having a bore leading from one end thereof and opening through one side thereof, a peripheral groove in said body intermediate the ends thereof and into which said bore opens, said fishing line having a loop passing through said bore from the axially outward end thereof with the bight portion of the loop encircling said body within the sides of said groove, said body having a recess opening into said groove for receiving an instrument to loosen said bight in the groove.

2. A float for a fishing line, said float comprising an elongated body having a bore leading from one end thereof and opening through one side thereof, a peripheral groove in said body and into which said bore opens, said fishing line having a loop passing through said bore from the axially outward end thereof with the bight portion of the loop encircling said body within the sides of said groove, said body having a recess opening into said groove for receiving an instrument to loosen said bight in the groove, said recess being located on the diametrically opposite side of said body from the entrance of said bore into said groove.

3. A float for a fishing line, said float comprising an elongated body having rounded ends and having a bore leading from one end thereof and opening through one side thereof, a peripheral groove formed in said body and into which said bore opens, said fishing line having a loop passing through said bore from the axially outward end thereof with the bight portion of the loop encircling said body within the sides of said groove, said body having a recess opening into said groove to receive an instrument to loosen said bight in the groove, said recess being located on the opposite side of the groove from and in extension of the axially inward end of said bore.

4. A fishing line float comprising a body adapted to normally float in an upright position, a bore extending upwardly in said body from its lower end, said bore opening at its upper end through the side of said body, said bore being adapted to receive a loop of the fishing line passed upwardly therein and with its bight portion encircling said body at a point intermediate the upper and lower ends of said body, the surface of said body having an encircling groove at said point receiving said bight portion of the loop of the fishing line.

5. A fishing line float comprising an elongated buoyant body provided with a longitudinal bore opening at its inner end through the side of the body and at its outer end through an adjacent end of said body, the outer surface of said body being indented by a circular groove into the bottom of which the said inner end of the bore opens, a loop on the fishing line passing inwardly through the said outer end of the bore and hitched around said body within the sides of said groove, said groove being of sufficient depth to protectively position the said loop inwardly of the surface of the body.

CHARLES A. WALKER.